United States Patent [19]

Kuyucak et al.

[11] Patent Number: 5,427,691
[45] Date of Patent: Jun. 27, 1995

[54] LIME NEUTRALIZATION PROCESS FOR TREATING ACIDIC WATERS

[75] Inventors: Nural Kuyucak, Pointe-Claire; Tamara Sheremata, Montreal, both of Canada

[73] Assignee: Noranda, Inc., Canada

[21] Appl. No.: 139,821

[22] Filed: Oct. 22, 1993

[30] Foreign Application Priority Data

Dec. 2, 1992 [CA] Canada ............... 2084327

[51] Int. Cl.[6] ............................................. C02F 1/62
[52] U.S. Cl. ........................... 210/713; 210/721; 210/724; 210/912
[58] Field of Search ............... 210/713, 714, 721, 722, 210/724, 912

[56] References Cited

U.S. PATENT DOCUMENTS

| | | | |
|---|---|---|---|
| 3,617,559 | 11/1971 | Cywin | 210/46 |
| 3,738,932 | 6/1973 | Kostenbader | 210/46 |
| 3,847,807 | 11/1974 | Herman et al. | 210/46 |
| 4,320,012 | 3/1982 | Palm et al. | 210/713 |
| 4,465,597 | 8/1984 | Herman et al. | 210/713 |
| 4,543,189 | 9/1985 | Rice et al. | 210/713 |
| 4,606,829 | 8/1986 | Rice et al. | 210/713 |
| 4,657,680 | 4/1987 | Zibrida | 210/713 |
| 4,698,163 | 10/1987 | Zibrida | 210/713 |
| 5,093,007 | 3/1992 | Domvile | 210/713 |
| 5,112,499 | 5/1992 | Murray et al. | 210/713 |

Primary Examiner—Neil McCarthy
Attorney, Agent, or Firm—Fitzpatrick, Cella, Harper & Scinto

[57] ABSTRACT

A lime-treatment method is disclosed to neutralize acidic waters containing heavy metals and sulphate and precipitate the metals as hydroxides along with calcium sulphate solids which are called sludge. The method comprises neutralizing the water in two reactors, the pH of the first reactor being increased to 4–4.5 using a predetermined amount of recycled sludge to precipitate only ferric hydroxides whereas other metal hydroxides coming from the recycled sludge are dissolved, the pH of the second reactor being increased to 9–10 using a mixture of lime and a small amount of the sludge recycled to the first reactor; feeding the ferric hydroxides precipitated in the first reactor to the second reactor to act as nuclei in the second reactor to promote crystallization; and introducing air into the second reactor to oxidize ferrous iron to less soluble ferric iron which results in formation of a more stable sludge compared to ferrous sludge.

6 Claims, 1 Drawing Sheet

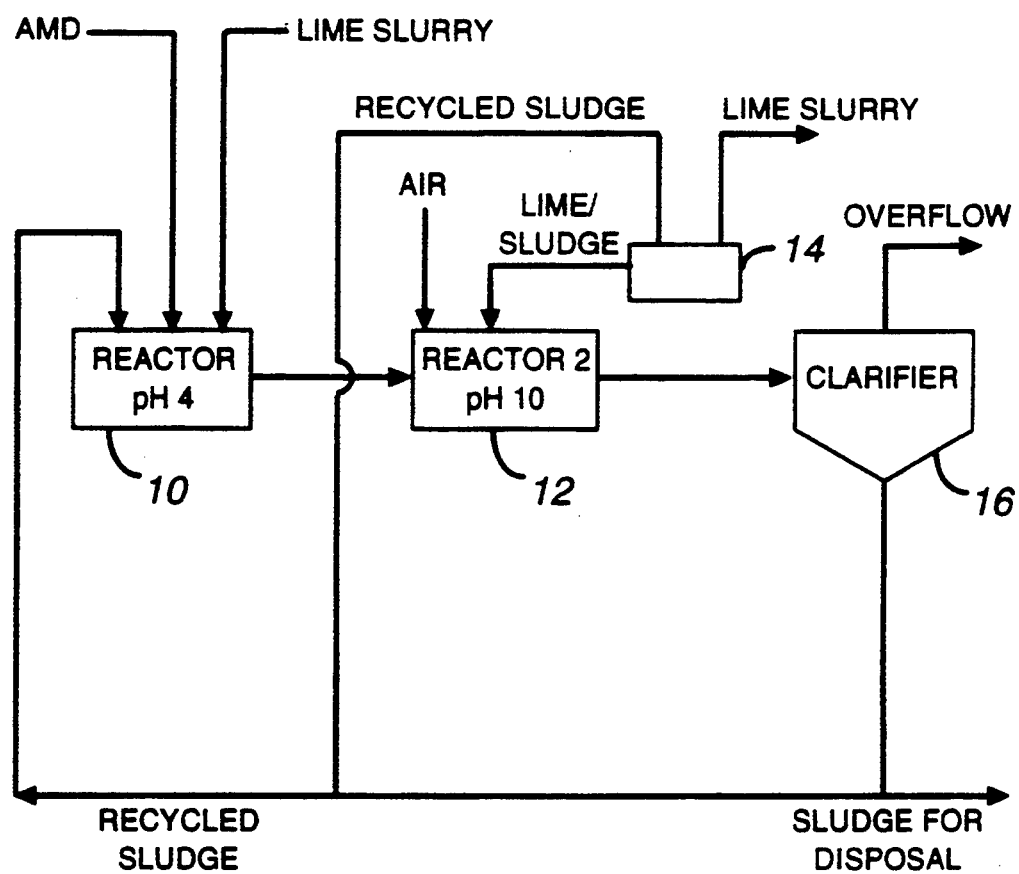

LIME NEUTRALIZATION PROCESS FOR TREATING ACIDIC WATERS

This invention relates to a process for treating acidic waters, more particularly acid mine drainages.

BACKGROUND OF THE INVENTION

Acid mine drainages (AMD) naturally occur at mine sites and usually contain acidity, sulphate and several heavy metals such as iron, zinc, copper, lead, manganese, aluminum, cadmium, nickel at varying degrees. The AMD, like other industrial wastewaters, must be treated for neutralization of acidity and removal of heavy metals prior to its release to the environment. One method of treating AMD is to use a neutralizing material. Although the solubility of the various heavy metals varies with the pH of the solution in which they are dissolved, most of the heavy metals can be kept insoluble at basic pH levels, i.e. 9–11 by adjusting the pH of the acidic wastewater with a neutralizing reagent. Lime is often recommended for neutralization because of its calcium ion content, simplicity and relatively low cost. Calcium ions form insoluble calcium salts such as calcium sulphate at neutral or alkaline pH levels whereas heavy metals are precipitated as their hydroxides. In a specifically designed process, calcium sulphate precipitates formed can play an environmentally safe binder role as nuclei for heavy metals precipitated by structuring the formation of stable crystals or crystalline particles. Metal hydroxide and calcium sulphate precipitates, commonly called "sludge", undergo a solid/liquid separation process. A clarifier/thickener, in which sludge settles by gravity, is a common device used for producing thickened sludge for disposal. Denser sludge composed of crystalline precipitates, settles better and faster resulting in an enhanced solid/liquid separation process and improved effluent quality. Due to denser sludge produced, the volume of the clarifier required can marginally be reduced and some savings can be obtained in the unit operation cost of the process. Reduction in sludge volume is also desirable in order to decrease the cost of sludge management (e.g. disposal and storage costs). Metal hydroxide sludges are usually not chemically stable; they are susceptible to changes in the environmental conditions such as pH. Metals in an unstable sludge are easily redissolved and are leached out from the sludge and report to the environment. Therefore, the sludge generated must be chemically stable.

The conventional lime neutralization process advocates simply the addition of lime as slurry to adjust the pH of the AMD to a desired level whereby heavy metals will be precipitated. Specified amount of air is also introduced to the water to oxidize ferrous iron to ferric iron for complete precipitation. The settled precipitates are gelatinous-like with low solids content, generally between 0.5–1 weight percent solids. Separation of gelatinous-like solids from the treated water is difficult and requires large expensive thickeners. In such a system, the precipitated calcium salts are not only removed with the precipitated heavy metals, but are also deposited on the surfaces of the equipment and piping used to treat or transport the wastewater, which is called scale formation. Layers of the salt accumulate and eventually clog the equipment causing periodic shut down of the equipment for removing deposits. Such maintenance increases the cost of the treatment process.

To prevent scale formation, lime slurry is first mixed with immense amount of polymer and is then used to neutralize AMD containing high sulphate levels. However, the pH must be adjusted to the desired level at various stages and residence times. Such a multistep or multistage process is time consuming and requires extra reactors for neutralization. The process is not effective for water containing less than 3600 mg/L sulphate. As a result, high sulphate requirement also limits the process from broad application. The solid content of the settled precipitates is not more than 10 percent, even, after treatment of high sulphate AMD.

Another process proposes the use of limestone as a neutralizing reagent to obtain denser sludges. Due to high buffering capacity of limestone at about pH 6–7, the pH of the acidic water cannot be raised to pH 9–10, which is necessary to precipitate a wide range of heavy metals present in AMD, with limestone alone. Limestone is effective in removing ferric iron. Ferrous iron must be oxidized to ferric iron prior to treatment. Oxidation of ferrous iron at acidic pH levels with air is almost impossible because of very slow reaction rates and requires expensive reagents and techniques such as use of hydrogen peroxide. The limestone should also have certain properties, such as high quality and very fine particles. To circumvent drawbacks of limestone neutralization process, a two-stage process in which limestone is first used to increase the pH to 6–7 and then lime is added to the water to obtain the desired pH, has been suggested. However, the two-stage method does not address problems associated with the oxidation of iron, generation of high density sludge and elimination of scaling.

In other methods, sludge with relatively high density and lower volume is generated. The methods are based on recycling a specified amount of sludge with a specified amount of solids to the process. It has been found that when the recycled sludge is used as a carrier for the neutralizing agent, a sludge with high solids and low volume is obtained. The neutralizing agent is adsorbed on the recycled sludge and that mixture is introduced to the acidic water to raise the pH to 8–9 in one step. The method is quite efficient in treating waters containing high levels of iron and small amounts of other heavy metals. However, the ratio of ferrous to ferric iron must be kept at a specific proportion, which is difficult and requires a well-controlled oxidation process, to be able to obtain expected results. Removal of a wide range of heavy metals cannot be achieved by adjusting the pH to 8–9 in one step, since removal of some metals (e.g. cadmium, lead) requires higher pH levels (i.e. pH 10–11) where a portion of metals precipitated at lower pH levels will be dissolved. In addition to production of poor final effluent quality, the process cannot resolve the problems associated with the precipitation of insoluble calcium salts ("scaling").

DESCRIPTION OF THE INVENTION

It is the object of this invention to remove a wide range of heavy metals from AMD using recycled sludge and lime as the neutralizing agents and generate less voluminous sludges with high solid contents (i.e. >10%).

It is another object of this invention to improve the chemical stability the sludge to be disposed, in terms of decreasing amount of leachable metals during its storage without consuming or adding excess amount of lime.

It is also an object of this invention to remove a wide range of metals from acid mine drainages and other types of acidic waters to very low concentrations; the quality of the final effluent complies with the regulated standards.

If is further object of this invention to decrease scaling of the equipment and piping with insoluble calcium salts.

The lime-treatment method in accordance with the present invention comprises neutralizing the water in two stages. The pH in the first reactor is increased to 4-4.5 using specified amount of recycled sludge and, if necessary, lime to precipitate only ferric hydroxides whereas other metal hydroxides coming from the recycled sludge are dissolved. In the second reactor, a mixture of lime and a small amount of recycled sludge, which is about 20% of the sludge used in the first reactor, are introduced to adjust the pH to 9-10. The ferric hydroxides precipitated in the first reactor are fed to the second reactor to act as nuclei in the second reactor to promote crystallization. Air is also introduced into the second reactor to oxidize ferrous iron to less soluble ferric iron which results in formation of a more stable sludge compared to ferrous sludge.

Following the addition of a flocculant, the slurry from the second reactor is passed to a solid/liquid separation device (e.g. a clarifier). The sludge obtained from this method contains at least 10% solids. The quality of the wastewater so treated is in compliance with the regulated standards.

SHORT DESCRIPTION OF THE DRAWING

This invention will now be disclosed by way of example with reference to a drawing which illustrates a flow sheet of the two stage neutralization methods.

DETAILED DESCRIPTION OF THE INVENTION

This invention is intended as a method for treating acidic wastewaters containing heavy metals and sulphate, such as acid mine drainages (AMD), where a lime slurry (CaO) containing a specified amount of recycled sludge is added to the water as a neutralizing reagent. The neutralization is performed in two stages; the pH of the water is raised to 4-4.5 in a first reactor 10 using recycled sludge and, if necessary, lime and then is increased to 9-10 depending on the metal species present in a second reactor 12 using recycled sludge and lime mixed in a tank 14. The amount of sludge being recycled to the first reactor is generally higher than that is added to the second reactor (e.g. 5× more). In the first reactor, only ferric hydroxides and perhaps some calcium sulphate are precipitated whereas other metal hydroxides coming with the recycled sludge are dissolved except calcium salts (e.g. calcium sulphate). The precipitates formed in the first reactor are stable crystals in nature and act as nuclei in the second reactor to promote the phenomenon of crystallization. Precipitation of aluminum, that interfere with the formation of stable calcium sulphate crystals, in the first reactor is eliminated by adjusting the pH to 4-4.5. Aeration in the second reactor oxidizes ferrous iron to less soluble ferric iron which results in formation of a more stable sludge to compared ferrous sludge.

The sludge from the second reactor is passed to a solid/liquid separation device 16 to provide a sludge containing at least 10% solids. The sludge is denser and settles faster than that generated by other methods. The total volume of the sludge is at least ½ of the sludges generated by other methods. The texture of the sludge appears to be granular rather than a paste-like texture. The sludge is chemically more stable in terms of leachable metals than that of others. Lime consumption is reduced by 10-20% as compared to other methods. The quality of the treated water is suitable for discharge to the environment.

Although the invention has been disclosed with reference to a preferred embodiment, it is to be understood that it is not limited to such embodiment and that other alternatives are also envisaged within the scope of the following claims.

We claim:

1. A method to neutralize acidic waters containing heavy metals and sulphate, and precipitate the metals as hydroxides to form a stable sludge, said method comprising the steps of:
   a) raising the pH of the water to 4-4.5 in a first reactor by adding a sufficient amount of the sludge produced in step c) to selectively precipitate the iron present as ferric ions in the water in the form of ferric hydroxide while the sludge, except for the ferric hydroxide present therein, completely dissolves in the water;
   b) transferring the mixture of step a) in a second reactor wherein the pH of the water is increased to 9-10 by adding either (i) lime, (ii) sludge produced in step c), or (iii) mixtures thereof, to cause precipitation of the heavy metals in the form of metal hydroxides, to form a stable sludge; and
   c) injecting air into the second reactor to oxidize ferrous ions remaining in the water to ferric ions, which will precipitate as ferric hydroxide in the sludge.

2. A method as defined in claim 1, further comprising the step of passing the sludge from step c) to a solid/liquid separation device to provide a sludge containing at least 10% solids.

3. A method defined in claim 1, wherein lime is added in the first reactor.

4. A method as defined in claim 1, wherein about one fifth of the sludge added in the first reactor is left in the mixture of step a) before it is transferred in the second reactor.

5. A method as defined in claim 1 wherein the mixture of step a) further comprises calcium salts.

6. A method as defined in claim 5 wherein the calcium salt comprises calcium sulphate.

* * * * *